May 7, 1946.  R. H. BENTLEY  2,399,906
INDEXING MEANS FOR MULTIPOSITION ELECTRIC SWITCHES
Filed Sept. 1, 1943  3 Sheets-Sheet 1

*Inventor*
ROBERT H. BENTLEY
*by his attorneys*
Howson and Howson.

*Inventor*
ROBERT H. BENTLEY
*by his attorneys*
Howson and Howson.

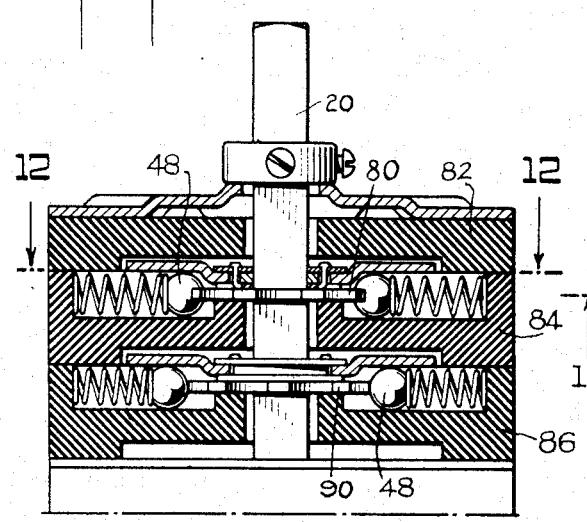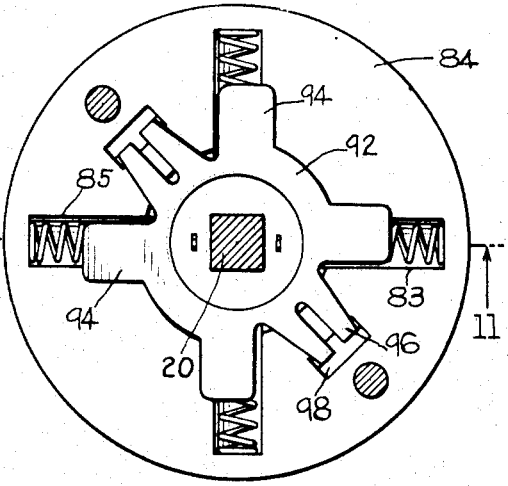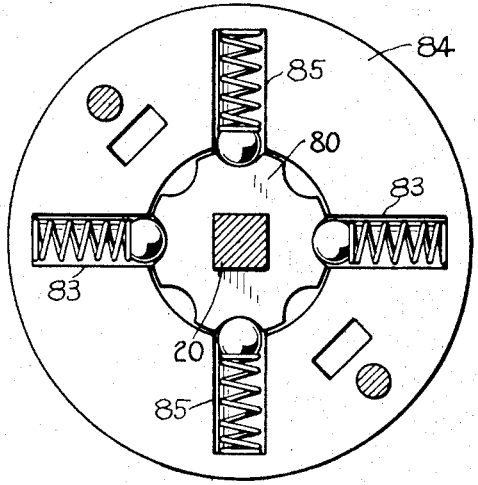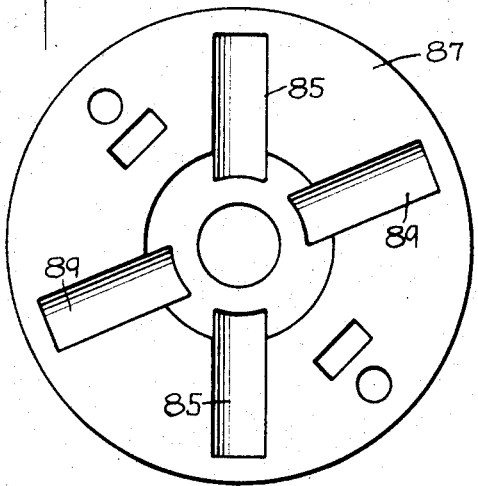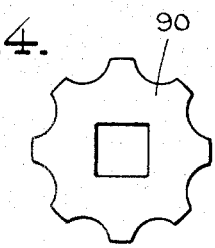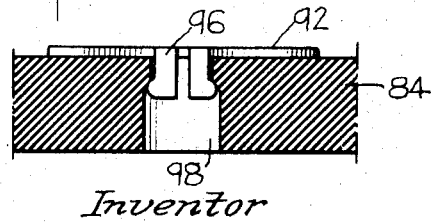
Inventor
ROBERT H. BENTLEY
by his attorneys
Howson and Howson Patented May 7, 1946

2,399,906

UNITED STATES PATENT OFFICE 2,399,906

INDEXING MEANS FOR MULTIPOSITION ELECTRIC SWITCHES

Robert H. Bentley, Hartford, Conn., assignor to The Arrow-Hart & Hegeman Electric Company, Hartford, Conn., a corporation of Connecticut Application September 1, 1943, Serial No. 500,853

15 Claims. (Cl. 74—527)

This invention relates to means for indexing the several positions of multi-position electric switches, more particularly rotary electric switches.

It is an object of this invention to provide an improved indexing means particularly useful in rotary electric switches built up of individual sections and having a main shaft carrying the movable contacts, the handle, and the indexing member.

Another object is to provide indexing means in a switch of the foregoing type having provision for multiplying the number of positions the switch may occupy, without the necessity of changing the form or structure of any of the parts employed.

Another object is to provide an indexing means for rotary electric switches wherein it will be possible to double the number of positions that the switch may occupy merely by varying the positions of parts of the indexing means, without the necessity of providing additional parts or increasing the size of the switch.

Many other objects and advantages of my invention will become apparent as it is described in connection with the accompanying drawings.

In the drawings:

Fig. 11 is a section view through another form of the invention, the section being along line 11—11 of Fig. 12;

Fig. 12 is a transverse section view taken along line 12—12 of Fig. 11;

Fig. 13 is a view similar to Fig. 12, but with the retaining member removed for clarity;

Fig. 14 is a plan view showing in detail the lower indexing cam used in Fig. 11;

Fig. 15 is a detail view of the ball and cam receiving member usable in another form of the invention;

Fig. 16 is a detail section view illustrating the attachment of the retaining member to the ball and cam receiving member of Fig. 11.

Figure 1:
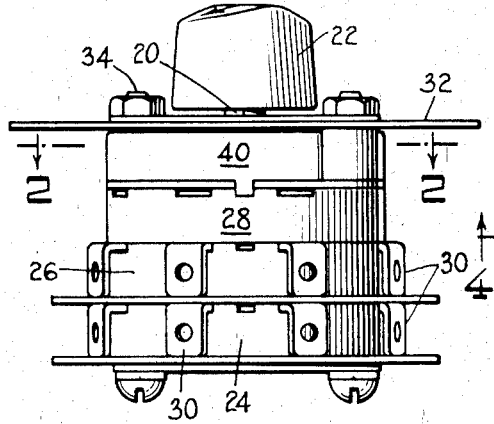
Fig. 1 is an elevation view of a switch embodying my invention.

Referring to the drawings, wherein like reference numerals indicate like parts in the several views, the switch to which the invention is applied is a rotary electric switch having a main shaft 20 extending through the switch and having a handle 22 for manipulation on top of the shaft. The switch body is made up of a plurality of insulating sections 24, 26 and 28 conveniently made of molded insulating material and having contact and terminal members mounted therein with the terminal portions 30 extending therefrom while the contact portions (not visible) lie within the sections and are adapted to be successively engaged by movable contact members (not visible) that are insulated from and rotate with the main spindle 20 as the handle 22 is turned. Since the details of the enclosed contact structure and the method of making up the switch body form no part of the invention, they are not further described herein. The sectional switch body and the indexing section hereinafter described are held together and upon a mounting plate 32 by bolts 34 passing entirely through all of the sections.

Figure 4:
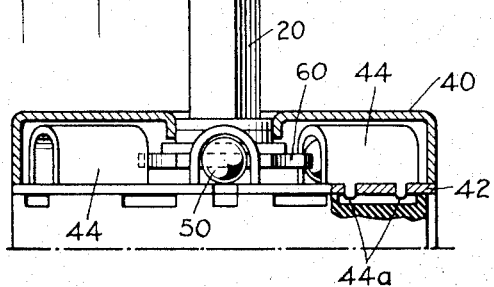
Fig. 4 is a vertical section view of the cover for the indexing structure of Figure 1, with the section being taken along the line 4—4 of Fig. 2, but with the indexing structure shown in elevation and with the handle and lower portion of the switch omitted.
Figure 5:
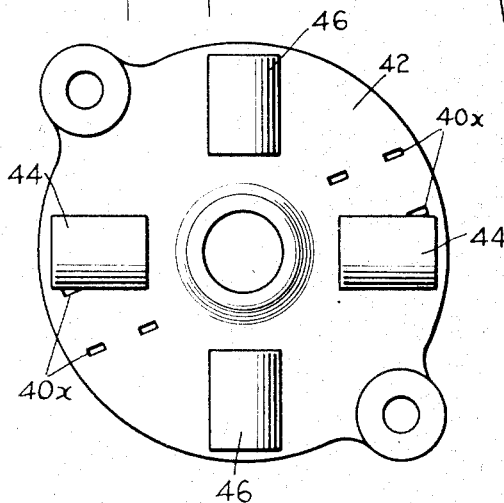
Fig. 5 is a plan view showing in detail the mounting means for the indexing balls used in the switch of Figs. 1-4.

The indexing means is housed within a metallic cup-shaped cover 40 which seats invertedly upon a circular plate 42 that lies on top of the uppermost insulation section 28. Between the cover 40 and plate 42, and mounted upon the plate 42, are pairs of diametrically opposite arcuate metallic cages or housings 44 and 46 for indexing balls 48 and 50 normally outwardly pressed from the cages or housings by springs 49. The outer ends of the springs 49 press against the flange of the cover or cup 40, while the inner ends of the springs press the balls radially inward. In this manner, the springs are held confined within their cages. To maintain the cages in predetermined position, lugs (for example 44a) are formed on the bottom edges to be received in sets of apertures 40x or 40y of the plate 42 (see Figs. 3, 4 and 5), there being four apertures to a set and the two sets 40x being diametrically opposite, as are also the two sets 40y. The apertures 40x or 40y of each set are symmetrical about diametral axes which are arcuately spaced 22½ degrees apart for reasons which will hereinafter appear. For engagement with the balls 48 and 50, an indexing cam member 60 is provided having eight ball-receiving recesses and eight high spots or high points. (The number eight is chosen for purposes of illustration and not in the manner of limitation of the invention, for it will be obvious as the invention is described that the number of high spots and depressions in the cam will depend entirely on the number of positions desired for the switch to occupy.)

Figure 2:
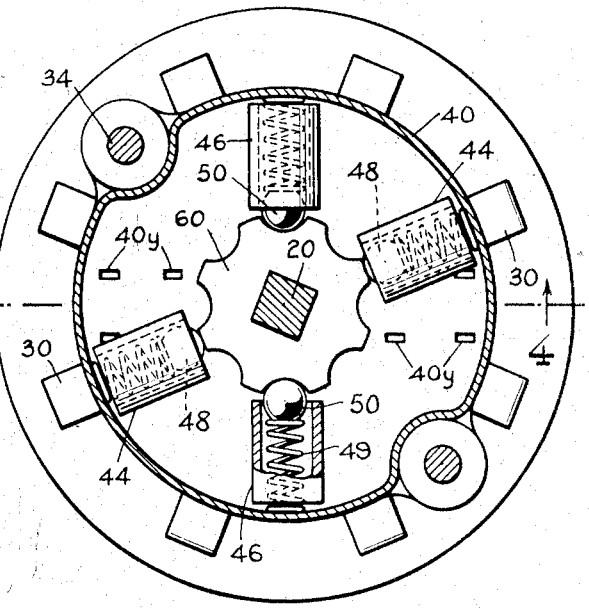
Fig. 2 is a transverse section view taken along the line 2—2 of Fig. 1.
Figure 3:
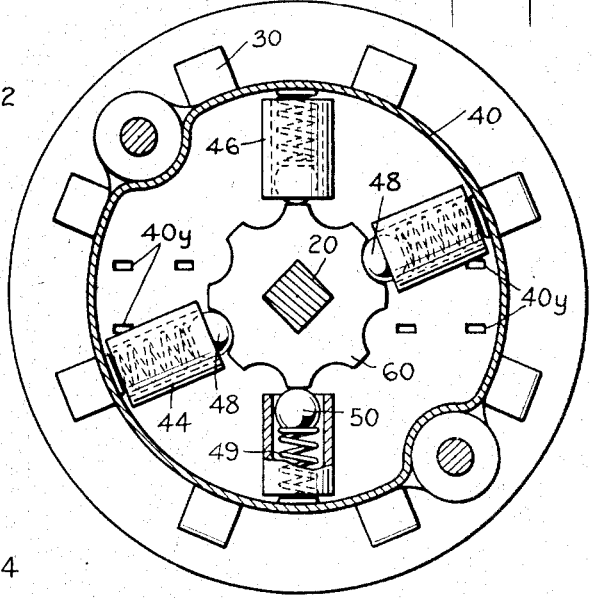
Fig. 3 is a transverse section view similar to Fig. 2, but showing the switch in another position.

Referring to Fig. 2, it may be observed that the diametrically opposite balls 50 rest in recesses of the cam member and hold the switch spindle and cam member in the desired position, while the diametrically opposite balls 48, being spaced 22½ degrees from the balls 50, perform no indexing function in the position of that figure, because they rest upon high points of the cam member 60. Referring to Fig. 3, it will be noted that the switch spindle and cam member have been turned 22½ degrees so that the balls 48 now rest in cam recesses, while the balls 50 rest upon high points in the cam. From the foregoing, it will be apparent that it is possible for the switch spindle to occupy sixteen different positions.

By moving the cages 44 so that their lugs rest in the sets of apertures 40y of the plate 40, the cages or housings 44, 46 will be spaced 90 degrees apart. When so disposed when a cam member like that shown in Figs. 2 and 3 is employed, the switch spindle will turn 45 degrees before the balls are received in any recess on either side of the recess in which they were previously received. Under these conditions the switch will be able to occupy only eight positions.

The positions of the cages 44 may be either permanent or temporary. If the ends of the lugs 44a are peened over, the housings will be permanently affixed in their position. If, on the other hand, these lugs do not have their ends peened over, the housings may be moved so that the number of positions the switch may occupy may be varied after the manufacture of the switch is complete. Under such conditions, where variation may be desirable after completion of manufacture, it may be desirable to have the cover 40 cooperate with the plate 42 as to prevent movement of the cages or housings 44 sufficiently to disengage their lugs from the apertures in the plate 42.

Referring now to the form of invention illustrated in Figs. 6–10, the form of arrangement of the cam and the spring-pressed balls may be the same as that described in the preceding form. So also may be the cages or housings for the balls 50 and their springs 49. The balls 48, however, are differently positioned and guided.

Figure 10:
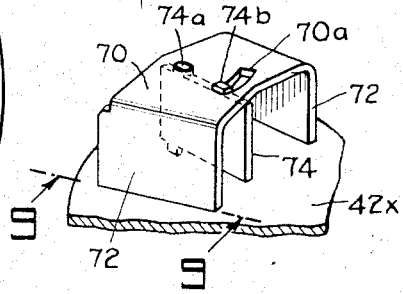
Fig. 10 is a perspective view of the ball-receiving cage mounted upon the plate in the form of invention shown in Figs. 6-9.

The structure for positioning and guiding the balls 48 in the form of Figs. 6–10 is illustrated in detail in perspective in Fig. 10. The structure comprises a U-shaped stamped sheet metal bridge 70 whose side walls 72 are divergent and lie in a plane parallel to the planes of expected radial movement of the balls 48 in the two paths in which it is desired that they shall be capable of alternatively moving. The bridge member 70 is permanently affixed in the desired position by means of lugs 71 extending from the bottom of the side walls 72 into a plate 42x that is the equivalent of mounting plate 42.

Figure 6:
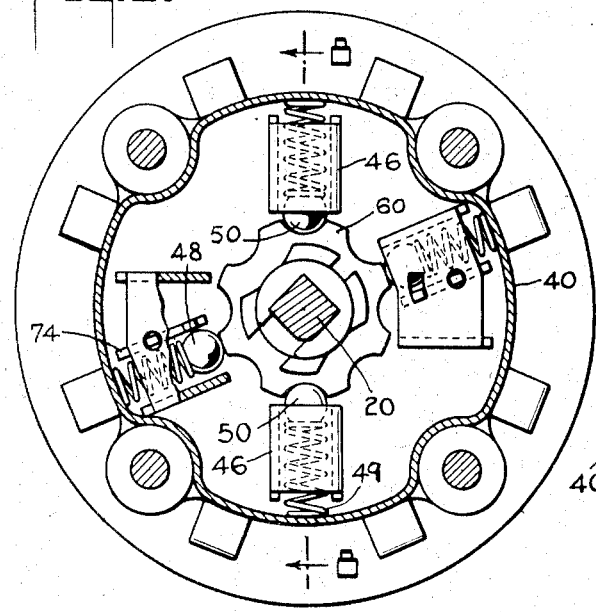
Fig. 6 is a view similar to Fig. 3, but of another form of the invention.
Figure 8:
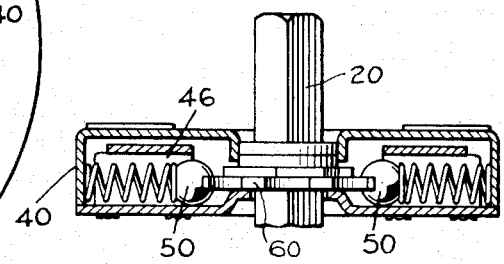
Fig. 8 is a fragmentary transverse vertical section view through the form of invention shown in Figs. 6 and 7, with the section being taken along line 8—8 of Fig. 6.
Figure 7:
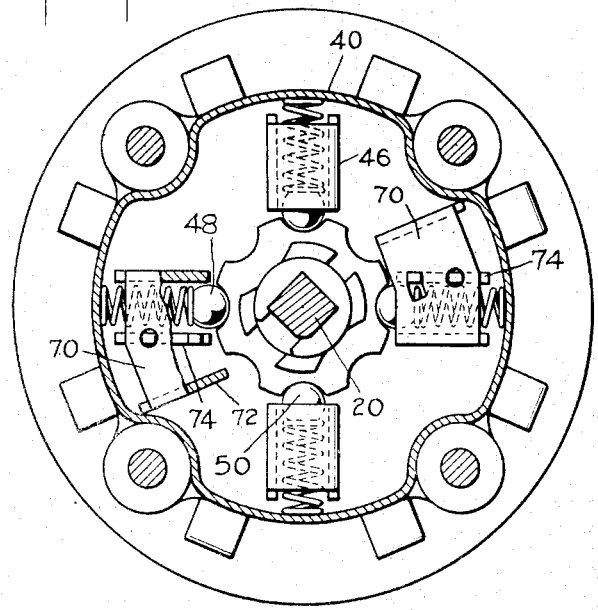
Fig. 7 is a view similar to Fig. 6, but with the indexing balls in a different position.
Figure 9:
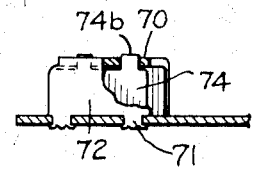
Fig. 9 is a fragmentary detail view partly in section and partly in elevation, of the ball-receiving cage of the form of invention illustrated in Figs. 7-8, the section being taken along the line 9—9 of Fig. 10.

Between the side wall 72 is a swinging vane or guide wall 74 having oppositely extending pivotal lugs 74a from its top and bottom edges at or near one end thereof. At or near the opposite end, and also oppositely extending from the top and bottom of said wall, are other lugs 74b adapted to move within the arcuate recess 70a provided in the top surface of the member 70. With this arrangement, and when the parts thereof are proportioned and arranged in the manner indicated in the drawings, the balls 48 and their springs may be placed on either side of the swinging vane 74. In Fig. 6 they are shown on one side, and in Fig. 7 they are shown on the other. With the balls placed as illustrated in Fig. 7 and using a cam having eight depressions and eight high points, the switch spindle 20 may be caused to move into eight different positions. With the balls placed on the other side of the vane 74, as shown in Fig. 6, the path of their movement will be advanced 22½ degrees from their position in Fig. 7, so that for similar reasons given in the description of the form of invention of Figs. 1–5, the switch spindle may be caused to occupy sixteen different positions without the necessity of making any change in the structure of the switch after its manufacture.

Referring to the form of invention illustrated in Figs. 11, 12, 13 and 14, here again the switch is made up, or may be made up, of a plurality of insulated sections. However, the indexing means is enclosed within the insulating sections, made up of a series of recessed insulation discs 82, 84, 86, rather than within the stamped sheet metal cover of the previously-described forms of the invention. A cam member 80 like that of the previously-described forms, may be employed to turn with the switch spindle 20 and the depressions in the cam may receive spring-pressed balls 48 and 50 which, with their springs, are located and guided within two pairs of aligned radially-extending passages 83, 85, in the insulating disc member 84. If it is desired to create a 16-position switch, a cam as illustrated in Fig. 14, with its depression advanced 22½ degrees from the position shown in the cam of Fig. 13, may be employed. It will be positioned on the switch spindle at a position spaced above or below (below in Fig. 11) the indexing section just described. To cooperate with the cam 90, spring-pressed balls like those described are located in a section or insulation disc 86 identical with the disc 84. This type of arrangement is particularly advantageous in switches which are made up of interchangeable sections, for when the switch is made up it will then be known how many positions it is desired to have the spindle occupy. Thus it can be determined while the switch is being put together, whether one or two indexing sections should be used. This type of structure has the advantage that there are four indexing balls and therefore the indexing function is more firmly and positively accomplished and there is less likelihood of the switch being moved accidentally from one of its chosen positions. Since switches of this type are often used for Army and Navy use, where severe shocks are not unusual, it is very important that a firm position-locating characteristic be embodied in the switch structure.

In some instances, it may not be necessary to utilize four balls for fixing the switch in its several positions. Under such conditions it may be unnecessary to use two insulating sections for indexing purposes when 16 positions are desired. Under such conditions a disc-shaped section 87 of insulation made according to the illustration of Fig. 15 may be employed. In this form, the passageways 85 for receiving the balls 50 and their springs are identical to passages 85 of Figs. 11–13; and the passageways 83 for receiving the balls 48 and their springs are, in form, like passages 83 but, in position, passages 89 are spaced 22½ degrees from the position of the passageways 83 in Figs. 11-13. Thus, in the form shown in Fig. 15, it is possible to create either an 8 or a 16-position switch with the use of only one indexing section. For an 8-position switch, one set of balls will be omitted; for a 16-position switch, both sets are used.

In the form of invention in Figs. 11-13, and also in the form in Fig. 15, the indexing balls and springs may be conveniently held within their passageways by the use of a retaining member 92, so that during the manufacture of the switch, or if it becomes necessary to take it apart, the balls and springs will not fly out of their passageway in the course of assembly or disassembly. This retaining member may be stamped from sheet metal with spring and ball holding arms 94 radially extending over each of the passageways. The receiving member may be held in place upon the top surface of the insulating section by providing bifurcated radially-extending arms 96 with end portions bent at right angles down into recesses 98 formed within the insulating section for the purpose of receiving these bifurcated ends. The normal resiliency of the end portions of these bifurcated arms causes their enlarged tips to engage under a shoulder in the recesses 98 to hold the retaining member in position.

Many modifications in addition to those described will occur to those skilled in the art. Therefore I do not limit the invention to the forms described herein and illustrated.

I claim:

1. The means for locating and holding a rotary electric switch spindle in any of a plurality of angularly spaced positions comprising a rotary shaft, a cam mounted on and rotating with said shaft, said cam having a plurality of recesses and a plurality of high points, a mounting plate, a plurality of ball guiding cages mounted on said plate, spring-pressed balls moving inwardly and outwardly of said cages and engaging with said cam, one of said cages being constructed and arranged to cause the ball within it to engage a high point on the cam when another ball engages a cam recess and vice versa, whereby the number of positions into which the shaft may be indexed is twice the number of cam recesses.

2. The means for locating and holding a rotary electric switch spindle in any of a plurality of angularly spaced positions comprising a rotary shaft, a cam mounted on and rotating with said shaft, said cam having a plurality of recesses and a plurality of high points, a mounting plate, a plurality of ball-guiding cages, spring-pressed balls moving inwardly and outwardly of said cages and engaging with said cam, means for mounting at least one of said cages alternately, in one position wherein its ball will occupy a cam recess when another ball occupies a cam recess, or in another position wherein its ball will engage a high point on the cam when another ball engages a cam recess, whereby the number of positions into which the shaft may be indexed may be equal to, or twice, the number of cam recesses.

3. The means for locating and holding a rotary electric switch spindle in any of a plurality of angularly-spaced positions comprising a rotary shaft, a cam mounted on and rotating with said shaft, said cam having a plurality of recesses and a plurality of high points, a mounting plate, a plurality of ball-guiding cages, spring-pressed balls moving inwardly and outwardly of said cages and engaging with said cam, means for mounting at least one of said cages alternately, in one position wherein its ball will occupy a cam recess when another ball occupies a cam recess, or in another position wherein its ball will engage a high point on the cam when another ball engages a cam recess, whereby the number of positions into which the shaft may be indexed may be equal to, or twice, the number of cam recesses, and a cover member over said cages maintaining said alternately mountable cage in the selected position.

4. The means for locating and holding a rotary electric switch spindle in any of a plurality of angularly spaced positions comprising a rotary shaft, a cam mounted on and rotating with said shaft, said cam having a plurality of recesses and a plurality of high points, a mounting plate, a plurality of ball-guiding cages, spring-pressed balls moving inwardly and outwardly of said cages and engaging with said cam, means for mounting at least one of said cages alternately, in one position wherein its ball will occupy a cam recess when another ball occupies a cam recess, or in another position wherein its ball will engage a high point on the cam when another ball engages a cam recess, whereby the number of positions into which the shaft may be indexed may be equal to, or twice, the number of cam recesses, a cover member over said cages maintaining said alternately mountable cage in the selected position, and removable securing means for said cover, whereby said cover may be removed to permit change of position of said alternately mountable cage.

5. Indexing mechanism for rotary electric switches comprising a rotary shaft, a cam member mounted on and rotating with said shaft, said cam member having a plurality of recesses and a plurality of high points, a mounting plate, a plurality of indexing devices biased to engage said cam member, a plurality of guiding and holding means mounted on said plate for said indexing devices, means permitting variation in the positioning of said indexing devices to allow selection of alternate paths of movement, whereby the number of positions into which the shaft may be indexed may be equal to, or twice, the number of cam recesses.

6. Indexing mechanism for rotary electric switches comprising a shaft manually rotatable at will into selected positions, a cam member mounted on and rotating with said shaft, said cam member having a plurality of recesses and a plurality of high points, a plurality of indexing devices biased into non-locking engagement with said cam member for holding said shaft in selected positions from which it may be manually rotated at will, means forming a plurality of guiding means for said indexing means, certain of said guide means being constructed and arranged in relation to certain other of said guide means to cause the indexing devices in the former to engage cam recesses when the indexing devices in the latter guide means engage high points on the cam member, whereby utilization of indexing devices in certain of said guide means will enable indexing of said shaft in a number of positions equal to the number of cam recesses, or utilization of indexing devices in all said guide means will enable indexing of said shaft in a number of positions twice that of the cam recesses, and means overlying said guide means, said overlying means being removable to permit removal or replacement of certain of said indexing devices.

7. The means for locating and holding a rotary electric switch spindle in any of a plurality of angularly spaced positions comprising a rotary shaft, a cam mounted on and rotating with said shaft, said cam having a plurality of recesses and a plurality of high points, a plurality of guide and retainer means, a plurality of indexing devices cooperating with said guide and retainer means and biased into engagement with said cam, a mounting member for said guide and retainer means and so constructed and arranged that one of said guide and retainer means may be mounted alternately in one position wherein its indexing device will occupy a cam recess when another indexing device occupies another cam recess, or in another position wherein its indexing device will engage a high point on the cam when another indexing device occupies a cam recess, whereby the number of positions into which the shaft may be indexed may be equal to, or twice, the number of cam recesses.

8. A structure as described in claim 7, wherein the guide and retainer means comprise housings having projecting means, and said mounting member has a plurality of recesses to receive said projecting means to locate said guide and retainer in said alternate positions.

9. The means for locating and holding a rotary electric switch spindle in any of a plurality of angularly spaced positions comprising a rotary shaft, a cam mounted on and rotating with said shaft, said cam having a plurality of recesses and a plurality of high points, a plurality of guide and retainer means, a plurality of indexing devices cooperating with said guide and retainer means and biased into engagement with said cam, one of said guide and retainer means being constructed and arranged to permit one of said indexing devices to be inserted in either of two positions, to enable the shaft to be indexed into a number of positions equal to, or twice, the number of cam recesses.

10. The means for locating and holding a rotary electric switch spindle in any of a plurality of angularly spaced positions comprising a rotary shaft, a cam mounted on and rotating with said shaft, said cam having a plurality of recesses and a plurality of high points, a plurality of guide and retainer means, a plurality of indexing devices cooperating with said guide and retainer means and biased into engagement with said cam, one of said guide and retainer means having a pivoted member on either side of which one of said indexing devices may be placed, whereby when that indexing device is on one side the shaft may be indexed into twice as many positions as it can when said indexing device is on the other side of said pivoted member.

11. The means for locating and holding a rotary electric switch spindle in any of a plurality of angularly spaced positions comprising a rotary shaft, a cam mounted on and rotating with said shaft, said cam having a plurality of recesses and a plurality of high points, a plurality of guide and retainer means, a plurality of indexing devices cooperating with said guide and retainer means and biased into engagement with said cam, one of said guide and retainer means comprising an inverted U-member having a pivoted wall therein enabling the insertion of one of said indexing devices on either side of said wall, as and for the purpose described.

12. The mechanism for positioning a rotary electric switch spindle in a plurality of positions, comprising a rotary spindle manually rotatable at will into selected positions, a cam member turning therewith and having a plurality of recesses and high points, a plurality of spring-pressed balls biased into non-locking engagement with said cam member, means forming a plurality of passageways for guiding said springs and balls, one of said passageways being constructed and arranged to cause the member within it to engage in a cam recess while another engages a cam high point and vice versa, whereby the number of positions into which the spindle may be indexed is twice the number of cam recesses, and a stamped sheet metal member releasably retaining said balls in said passageways by means of a plurality of bifurcated radial arms with resilient inturned ends.

13. The mechanism for positioning a rotary electric switch spindle in a plurality of positions, comprising a rotary spindle manually rotatable at will into selected positions, a cam member turning therewith and having a plurality of recesses and high points, a plurality of spring-pressed balls biased into non-locking engagement with said cam member, an insulating disc having a plurality of aligned passageways formed therein to receive said springs and balls, a stamped sheet metal retaining member having portions overlying said passageways, means to releasably retain said retaining member on said insulating disc.

14. The mechanism for positioning a rotary electric switch spindle in a plurality of positions, comprising a rotary spindle manually rotatable at will into selected positions, a cam member turning therewith and having a plurality of recesses and high points, a plurality of indexing members biased into non-locking engagement with said cam member, an insulating disc having a plurality of aligned passageways formed therein to receive said indexing members, a stamped sheet metal retaining member having portions overlying said passageways, means to releasably retain said retaining member on said insulating disc, said passageways being angularly spaced from each other and related to said cam recesses to cause one of said indexing members to engage in a cam recess when another engages a cam high point, and vice versa.

15. The mechanism for positioning a rotary electric switch spindle in a plurality of positions, comprising a rotary spindle manually rotatable at will into selected positions, a cam member turning therewith and having a plurality of recesses and high points, a plurality of spring-pressed balls biased into non-locking engagement with a cam member, a flat disc-shaped mounting member of insulating material with a plurality of passageways formed therein to receive said springs and balls, a stamped sheet metal retaining member having portions overlying said passageways, and having radially extending bifurcated arms releasably retaining said retaining member on said mounting member, whereby said mounting member may be incorporated in a switch structure built up of similarly-sized contact-containing insulation sections.

ROBERT H. BENTLEY.